United States Patent
Beier et al.

(10) Patent No.: US 10,646,805 B2
(45) Date of Patent: May 12, 2020

(54) DEVICE OF A TURBOMACHINE FOR SEPARATING OIL FROM AN AIR-OIL VOLUME FLOW

(71) Applicant: Rolls-Royce Deutschland Ltd & Co KG, Blankenfelde-Mahlow (DE)

(72) Inventors: Juergen Beier, Schulzendorf (DE); Markus Blumrich, Berlin (DE)

(73) Assignee: ROLLS-ROYCE DEUTSCHLAND & CO KG, Blankenfelde-Mahlow (DE)

( * ) Notice: Subject to any disclaimer, the term of this patent is extended or adjusted under 35 U.S.C. 154(b) by 361 days.

(21) Appl. No.: 15/666,115

(22) Filed: Aug. 1, 2017

(65) Prior Publication Data
US 2018/0036664 A1 Feb. 8, 2018

(30) Foreign Application Priority Data

Aug. 3, 2016 (DE) .................. 10 2016 114 394

(51) Int. Cl.
*B01D 45/16* (2006.01)
*F01D 25/16* (2006.01)
(Continued)

(52) U.S. Cl.
CPC ............ *B01D 45/16* (2013.01); *F01D 25/16* (2013.01); *F01D 25/18* (2013.01); *F02C 7/06* (2013.01);
(Continued)

(58) Field of Classification Search
CPC ......... B01D 45/16; F01D 25/16; F01D 25/18; F02C 7/06; F02C 7/14; F05D 2220/323; F05D 2260/609
See application file for complete search history.

(56) References Cited

U.S. PATENT DOCUMENTS

| | | |
|---|---|---|
| 4,050,237 A | 9/1977 | Pall et al. |
| 5,429,208 A | 7/1995 | Largillier et al. |

(Continued)

FOREIGN PATENT DOCUMENTS

| | | |
|---|---|---|
| DE | 1137606 B | 10/1962 |
| DE | 102014113128 A1 | 3/2016 |

(Continued)

OTHER PUBLICATIONS

German Search Report dated Jun. 22, 2017 from counterpart German App No. 10 2016 114 394.4.

(Continued)

*Primary Examiner* — Cabrena Holecek
(74) *Attorney, Agent, or Firm* — Shuttleworth & Ingersoll, PLC; Timothy J. Klima

(57) ABSTRACT

A device of a turbomachine for separating oil from an air-oil volume flow, with a first separation appliance and a second separation appliance, wherein an air-oil volume flow from an oil-loaded area of the turbomachine can be supplied to the first separation appliance, and wherein the air-oil volume flow, the oil loading of which can be reduced in the area of the first separation appliance, can be supplied to the second separation appliance downstream of the first separation appliance by means of a conduit. An appliance for cooling the air-oil volume flow conducted inside the conduit is provided, being arranged downstream of the first separation appliance and upstream of the second separation appliance.

10 Claims, 4 Drawing Sheets

(51) Int. Cl.
*F02C 7/06* (2006.01)
*F02C 7/14* (2006.01)
*F01D 25/18* (2006.01)

(52) U.S. Cl.
CPC .......... *F02C 7/14* (2013.01); *F05D 2220/323* (2013.01); *F05D 2260/609* (2013.01)

(56) References Cited

U.S. PATENT DOCUMENTS

| | | |
|---|---|---|
| 9,370,739 B2 | 6/2016 | Beier et al. |
| 9,587,560 B2 | 3/2017 | Beier et al. |
| 2012/0060508 A1* | 3/2012 | Alecu ............... F01D 25/20 60/783 |
| 2015/0007531 A1* | 1/2015 | Beier ............... B01D 45/16 55/385.3 |

FOREIGN PATENT DOCUMENTS

| | | |
|---|---|---|
| EP | 2821598 A1 | 1/2015 |
| EP | 2821599 A1 | 1/2015 |
| EP | 2902691 A1 | 8/2015 |
| EP | 3168425 A1 | 5/2017 |
| FR | 2705733 A1 | 12/1994 |
| GB | 2376269 A | 12/2002 |

OTHER PUBLICATIONS

European Search Report dated Jan. 3, 2018 for counterpart European Patent Application No. 17180638.3.

* cited by examiner

DEVICE OF A TURBOMACHINE FOR SEPARATING OIL FROM AN AIR-OIL VOLUME FLOW

This application claims priority to German Patent Application 102016114394.4 filed Aug. 3, 2016, the entirety of which is incorporated by reference herein.

The invention relates to a device of a turbomachine for separating oil from an air-oil volume flow, with a first and a second separation appliance according to the kind as disclosed herein.

Aircraft gas turbines have an oil circuit, with the oil of the oil circuit being in particular used for lubricating and cooling rotor bearings and gear wheels as well as bearings of the gear box of the aircraft gas turbine. The oil circuit in particular comprises a tank device, a pressure pump, oil recirculation pumps, filters, an oil cooler, and a de-aeration system. In the oil circuit, the oil is conveyed by means of the pressure pump from the tank device via supply or pressure oil lines and a pressure filter to the areas of the engine that are to be impinged with oil. Further, the oil of the oil circuit is pumped via in particular multiple oil recirculation pumps from the respective areas of the engine back to the tank device via a filter appliance and an oil cooler. By means of the de-aeration system, the oil loading of the air-oil mixture that is created during operation of the aircraft gas turbine is reduced during operation of the aircraft gas turbine in the area of bearing chambers, and the cleaned air is discharged into the environment, while the oil that has been separated from the air-oil mixture remains in the oil circuit.

For example, it is known from DE 10 2014 113 128 A1 to supply an air-oil volume flow or so-called oily exhaust air via an inlet appliance to the tank device of an oil circuit of an aircraft gas turbine. Oil from the air-oil volume flow is separated in the area of the tank device by means of an oil separator, wherein the air-oil volume flow that exits the oil separator is discharged from the tank device via a conduit having a lower oil loading as compared to the air-oil volume flow that is supplied to the tank device. This air-oil volume flow can be supplied to a further oil separator for the further reduction of the oil loading, wherein the separated oil is supplied to the oil circuit, and the air-oil volume flow that flows out of the further oil separator is discharged into the environment.

The air-oil volume flow discharged into the environment can possibly have an undesirably high oil loading, so that an undesirably high oil loss of the oil circuit occurs during operation of the aircraft gas turbine, and a so-called smoke trail is created as a result of the air-oil volume flow exiting the aircraft gas turbine.

It is the objective of the present invention to create a device of a turbomachine of the kind as it is described more closely above, which is characterized by a high separation performance.

According the invention, this objective is achieved through a device with features as disclosed herein.

The device of a turbomachine according the invention, in particular of an aircraft gas turbine, for separating oil from an air-oil volume flow is embodied with a first separation appliance and a second separation appliance, wherein an air-oil volume flow from an oil-loaded area of the turbomachine can be supplied to the first separation appliance, and wherein the air-oil volume flow, the oil loading of which can be reduced in the area of the first separation appliance, can be supplied to the second separation appliance downstream of the first separation appliance by means of a conduit.

For the purpose of achieving a higher separation performance of the device, it is proposed according the invention to provide an appliance for cooling the air-oil volume flow that is conducted inside the conduit, with the appliance being arranged downstream of the first separation appliance and upstream of the second separation appliance.

In this manner, through the device embodied according to the invention, liquid droplet-shaped oil as well as vaporous oil can be effectively separated from the air-oil volume flow that is supplied to the device, and an air-oil volume flow that is discharged from the device into the environment has only a low oil loading or even represents an air flow that is completely free of oil. In addition, an oil loss of an oil circuit is also advantageously minimized by the effective separation of oil from the air-oil volume flow supplied to the first separation appliance, so that a weight of a turbomachine embodied with a device according to the invention is low, since—due to the fact that only a low amount of oil has to be made available—the tank devices can be designed to be correspondingly small.

The air-oil volume flow supplied to the first separation appliance is in particular loaded with liquid droplet-shaped oil as well as with vaporous oil, wherein the latter is in particular created by the high temperatures that are present in the areas impinged by oil during operation of the turbomachine, in particular bearing chambers. The first separation appliance of the device according to the invention is embodied for separating liquid droplet-shaped oil from the air-oil volume flow which is supplied to the first separation appliance, so that a loading of the air-oil volume flow with liquid droplet-shaped oil is reduced in the area of the first separation appliance. The air-oil volume flow flowing out of the first separation appliance is cooled downstream by means of the appliance. At that, the vaporous oil that is present in the air-oil volume flow is condensed, and it is either not separated or not separated to a desired extent in the area of the first separation appliance, as a result of which the loading of the air-oil volume flow with oil droplets increases again. The second separation appliance, to which the air-oil volume flow is supplied downstream of the appliance, is configured for separating oil droplets from the air-oil volume flow.

By arranging the appliance downstream of the first separation appliance, an efficient condensation of the vaporous oil into oil droplets is achieved, since a portion of the carried-along liquid droplet-shaped oil is separated from the air-oil volume flow already in the area of the first separation appliance, and the share of liquid droplet-shaped oil to be cooled is reduced, with a higher portion of the cooling performance of the appliance becoming available for the condensation of the vaporous oil.

In an advantageous embodiment of the device according to the invention, the appliance is embodied as an air cooling appliance, in particular as a surface cooler. At that, for the purpose of increasing a surface, the air-oil volume flow is divided in the area of the appliance in particular into multiple conduits that are in particular extending in parallel to each other, wherein these conduits that are formed as ribs are impinged by a cooling air flow and/or a cooling oil flow in particular transversely to the flow direction of the air-oil volume flow.

In an advantageous embodiment of a device according to the invention, it is provided that a by-pass channel of the turbomachine represents the appliance for cooling, wherein the conduit extends inside the by-pass channel at least in certain areas. In this manner, a condensation of the vaporous oil in the air-oil volume flow is achieved in a cost-effective and space-optimized manner without having to provide a separate cooling appliance. As an alternative to that, it can also be provided that the conduit extends through an engine nacelle or nacelle of the aircraft gas turbine, and can be cooled by means of a flow that occurs in the engine nacelle during operation of the aircraft gas turbine.

The appliance for cooling the air-oil volume flow conducted inside the conduit can be embodied as an oil cooling appliance, in which an oil line is for example arranged around the conduit that conducts the air-oil volume flow, wherein a surface enlargement by means of ribs can be provided for an effective cooling. For example, the oil used for cooling can come from a cooling appliance in the area of which the oil of the oil circuit is cooled by means of fuel.

In an advantageous embodiment of the device for cooling the air-oil volume flow conducted inside the conduit, the appliance is embodied as a fuel cooling appliance, wherein for that purpose the fuel is conducted inside a conduit that surrounds the conduit conducting the air-oil volume flow at least in certain areas.

In an advantageous embodiment of the device according to the invention, the appliance for cooling the air-oil volume flow conducted inside the conduit has an appliance for introducing, in particular spraying in, finely nebulized cooled oil into the conduit, wherein, through the cool oil introduced through the appliance, the vaporous oil of the air-oil volume flow is condensed, and the oil droplets that are created in the course of that process in the air-oil volume flow can be separated from the air-oil volume flow in a simple manner and with small effort in the area of the second separation appliance.

In a device that can be easily integrated into exiting systems, the first separation appliance is arranged inside a tank device of an oil circuit of the aircraft gas turbine, wherein the first separation appliance is for example embodied for de-aerating recirculated oil in existing systems.

Moreover, in a constructionally simple embodiment of the device according to the invention, the first separation appliance is embodied as a cyclone, wherein the air-oil volume flow supplied to the cyclone flows through the cyclone in a helical manner as a result of centrifugal forces, and in the course of this process the oil droplets of the air-oil volume flow are separated at a wall area of the cyclone due to the acting centrifugal forces.

In an advantageous embodiment of the device according to the invention, the second separation appliance is embodied as a centrifugal separator or as a so-called breather. The separation of oil droplets from the air-oil volume flow supplied to the second separation appliance is carried out in particular through a deflection area that is provided in the area of the breather and that acts as a centrifuge, wherein oil droplets with smaller diameters are captured by the metal foam that is arranged in the centrifugal separator, and are thus also filtered from the air-oil volume flow.

In a further advantageous embodiment of the device according to the invention, at least one conduit area is provided, by means of which an air-oil volume flow from a bearing chamber of the turbomachine can be supplied to the first separation appliance. However, an air-oil volume flow can also be supplied to the first separation appliance from other oil-loaded areas of the turbomachine, for example from an auxiliary device gearing appliance. The device according the invention is in particular suitable for supplying an air-oil volume flow from a high-temperature area of the turbomachine, in particular a bearing chamber of the turbomachine, since—due to the high temperatures that are present there during operation—an air-oil volume flow that is discharged from the bearing chambers is highly loaded with vaporous oil, which, unlike with conventional devices, can be separated from the air-oil volume flow in a simple manner with the device according to the invention.

Further advantages and advantageous embodiments of the device according to the invention follow from the patent claims and the exemplary embodiments that will be described in principle in the following by referring to the drawing, wherein, with a view to clarity, the same reference signs are used for structural components having identical structures and functions in the description of the different exemplary embodiments.

Herein:

Figure 1A:
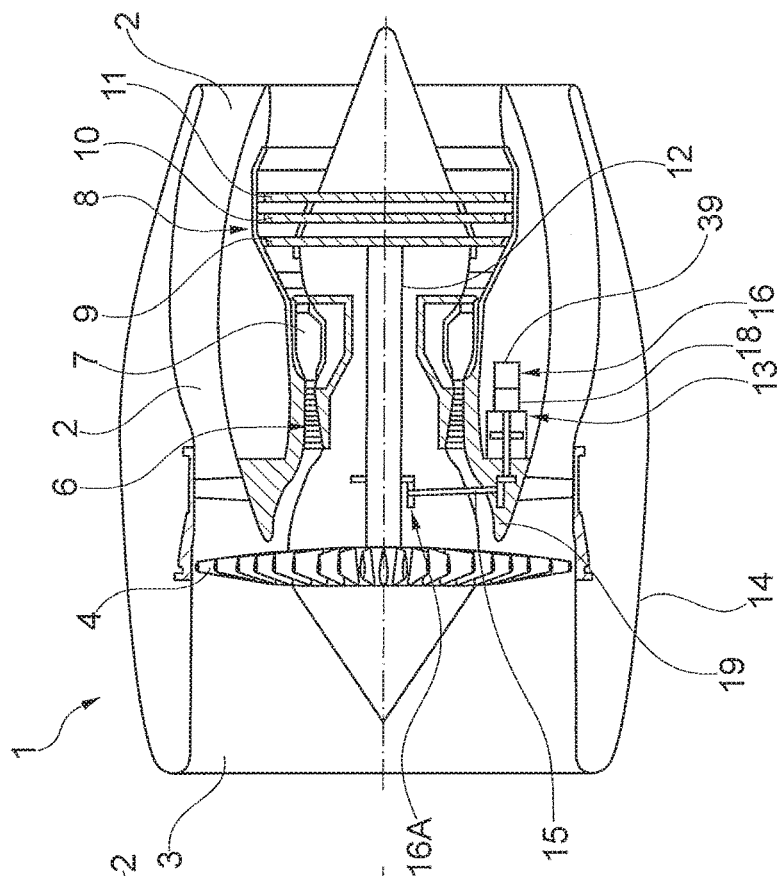
FIG. 1a shows a strongly schematized longitudinal section view of an aircraft gas turbine with a device for separating oil, wherein an auxiliary unit gear box appliance is arranged inside the fan casing.
Figure 1B:
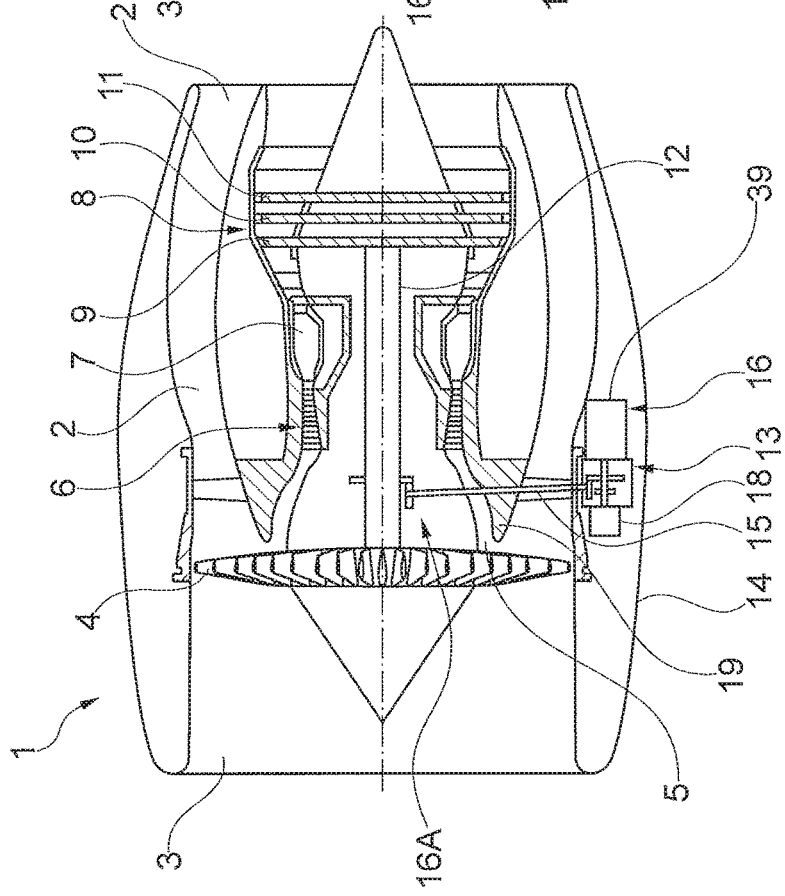
FIG. 1b shows, in a manner corresponding to FIG. 1a, a rendering of an aircraft gas turbine with the device for separating oil, wherein an auxiliary unit gear box appliance is mounted in the area of the engine core.

A turbomachine that is embodied as an aircraft gas turbine or a jet engine 1 is respectively shown in a longitudinal section view in FIG. 1a and FIG. 1b. The aircraft gas turbine 1 is configured with a by-pass channel 2 and an intake area 3, wherein a fan 4 connects to the intake area 3 downstream in a per se known manner. Downstream of the fan 4, the fluid flow in the aircraft gas turbine 1 is in turn divided into a by-pass and a core flow, wherein the by-pass flows through the by-pass channel 2 and the core flow flows into an engine core 5, which is in turn embodied in a per se known manner with a compressor appliance 6, a burner 7, and a turbine appliance 8. In the present case, the turbine appliance 8 has three rotor devices 9, 10 and 11, which are configured in a substantially comparable design and are connected with an engine shaft 12.

In the embodiment of the aircraft gas turbine 1 according to FIG. 1a, an auxiliary unit gear box appliance 13 is arranged inside an outer engine casing 14 that delimits a by-pass channel 2 and represents the outer circumferential area of the jet engine 1. In the present case, the auxiliary unit gear box appliance 13 is connected to the engine shaft 12 via a drive shaft 15 that extends in the radial direction of the jet engine 1 and via an inner gear box 16A, and is thus driven by the engine shaft 12 and supplied with torque during operation of the jet engine 1. Different auxiliary units 16 and a separation appliance 39 are supplied with torque by the auxiliary unit gear box appliance 13 to a desired extent. In addition, a tank device 18 of an oil circuit 20 of the aircraft gas turbine 1 is provided in the area of the auxiliary unit gear box appliance 13, representing a hydraulic fluid reservoir from which oil for cooling and lubricating different areas of the aircraft gas turbine 1 that are to be impinged by oil is extracted, such as bearing appliances, gear wheel pairs of the inner gear 16A and the auxiliary unit gear box appliance 13 as well as further assemblies of the aircraft gas turbine 1 that are to be cooled and lubricated.

In contrast to that, in the embodiment of the aircraft gas turbine 1 according to FIG. 1b, the auxiliary unit gear box appliance 13 with the auxiliary units 16, the separation appliance 39 and the tank device 18 is arranged in the radial direction between the by-pass channel 2 and the engine core 5 inside a structural component 19 that delimits the by-pass channel 2 as well as the engine core 5.

Figure 2:
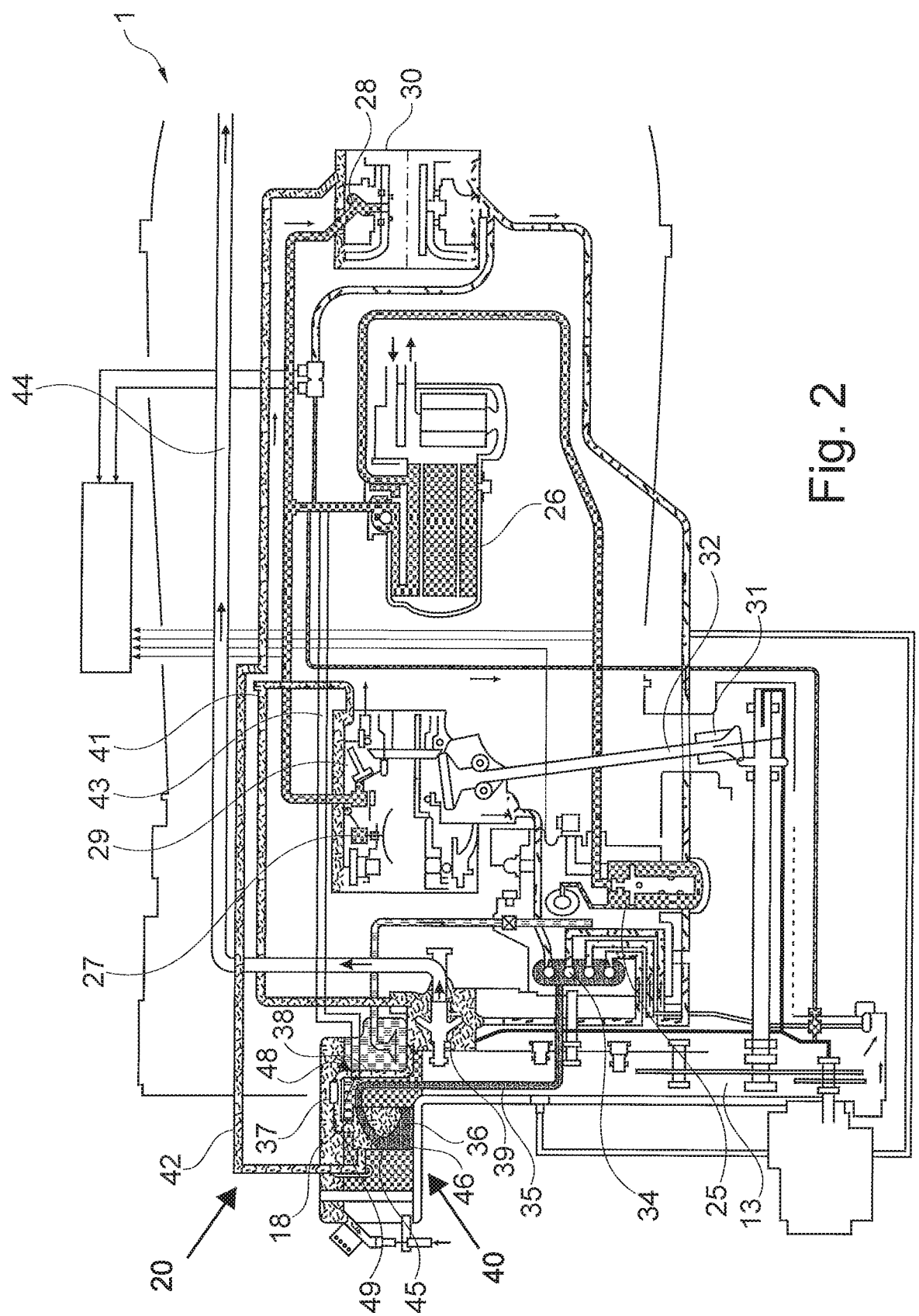
FIG. 2 shows, in a simplified manner, an oil circuit of the aircraft gas turbine with the device for separating oil.

In FIG. 2, the oil circuit 20 of the aircraft gas turbine 1 can be seen in more detail, wherein oil can be supplied to a cooling appliance 26 from the tank device 18 by means of a pump appliance 25, with the oil of the oil circuit 20 being tempered to a desired extent by the fuel of a fuel system in the area of the cooling appliance 26. Downstream of the cooling appliance 26, oil is supplied to consumers, in particular bearing appliances 27, 28 of a front bearing chamber 29 and a rear bearing chamber 30, and bearing appliances 31 for mounting a drive shaft 32 of the auxiliary unit gear box appliance 13, wherein the bearing appliances 27 and 28 are embodied for mounting engine shafts in the area of the bearing chambers 29 or 30 of the aircraft gas turbine 1.

Oil is conducted via a conduit 35 from the oil sumps of the bearing chambers 29 and 30 and of the auxiliary unit gear box appliance 13 back to the tank device 18 by means of multiple recirculation pumps 34, and is introduced into a first separation appliance of a device 40 for separating oil, which is embodied as a so-called deaerator 36 in the form of a cyclone. In the area of the cyclone 36, liquid droplet-shaped oil is separated from the oil-air mixture that is supplied from the conduit 35 to the first separation appliance 36, and is supplied to an oil reservoir of the tank device 18. An air-oil volume flow that forms during such a separation is discharged from the first separation appliance 36 via a conduit 38 that is provided with a pressure limiting valve 37, and is supplied to the second separation appliance 39, which in the present case is embodied as a centrifugal separator or a so-called breather 39.

In the area of the breather 39, a further separation of liquid droplet-shaped oil from the air-oil volume flow that is supplied to the breather 39 is performed, wherein the separated oil is in turn supplied to the oil reservoir of the tank device 18 via the recirculation pumps 34, while the air-oil volume flow having a reduced oil loading or the cleaned air is discharged into the environment via a conduit 44.

During the operation of the aircraft gas turbine 1, an air-oil mixture is respectively created in the area of the bearing chambers 29, 30 as well as in the auxiliary unit gear box appliance 13, wherein the air-oil mixture is supplied here from the front bearing chamber 29 via a conduit 41 directly to the breather 39, in the area of which oil is also separated from this air-oil volume flow in the above-described manner before being discharged into the environment via the conduit 44.

Here, the air-oil mixture that is created in the rear bearing chamber 30 is supplied to the cyclone 36 via a conduit 42 as an air-oil volume flow, with the cyclone 36 being arranged inside the tank device 18, wherein, in addition to the liquid oil droplets, the air-oil volume flow also contains a high share of vaporous oil or oil vapor due to the high temperatures that are present during operation of the aircraft gas turbine 1 in the area of the rear bearing chamber 30.

The air-oil volume flow that is supplied to the cyclone 36 via the conduit 42 as well as the oil-air mixture that is supplied to the cyclone 36 via the conduit 35 are introduced into an interior space 46 of the cyclone 36, which is delimited by a wall 45, in a substantially tangential manner. Due to gravity, the oil-air mixture and the air-oil volume flow downwards along the wall 45 in a helical manner, wherein, as a result of centrifugal forces acting during this process, oil droplets are separated from the oil-air mixture and the air-oil volume flow at the wall 45, forming an oil film there. Driven by gravity, the oil film flows downwards along the wall 45 into the oil reservoir of the tank device 18.

Due to the dynamic conditions that are present in the area of the cyclone 36, an air-oil volume flow that has a lower oil loading than the air-oil volume flow introduced into the cyclone 36 via the conduit 42 rises in a central area of the cyclone 36. This is due to the fact that it is in particular large oil droplets that are separated from the air-oil volume flow supplied to the cyclone 36 as it flows through the cyclone 36. The air-oil volume flow that rises inside the cyclone 36 and is still loaded with vaporous oil is supplied to the breather 39 via the conduit 38 in the above-described manner.

In addition, an appliance 48 for cooling the air-oil volume flow conducted inside the conduit 38 is provided, which is shown only in a schematic manner. Via a conduit 43 that extends from the cooling appliance 26 to the conduit 38, an appliance 49 for spraying in oil into the conduit 43 is supplied with cool oil. Here, cool oil, for example finely nebulized oil in the form of a spray cone, is introduced via the appliance 49 into the conduit 38 either in and/or counter to the flow direction of the air-oil volume flow inside the same, wherein the vaporous oil conducted inside the conduit 38 condenses to form droplets as a result of the temperature of the sprayed-in oil, which is low as compared to the temperature of the air-oil volume flow conducted inside the conduit 38. This procedure is particularly effective, since the air-oil volume flow that is conducted inside the conduit 38 has only a very small share of oil droplets or does not carry any oil droplets at all following the previous separation of oil droplets in the area of the cyclone 36, which have a negative impact on the condensation of the vaporous oil.

The droplet-shaped oil of the air-oil volume flow that is condensed downstream of the appliance 49 can be separated from the air-oil volume flow in a simple manner in the area of the breather 39, so that the air-oil volume flow that is discharged from the breather 39 into the environment has a very low oil loading.

FIG. 3 to FIG. 7 show alternatively embodied devices 50, 60, 70 and 80 for separating oil from an air-oil volume flow conducted inside the conduit 38 in a strongly schematized manner, wherein, when it comes to the functionality of the devices 50, 60, 70, 80, it is generally referred to the embodiments regarding device 40. The devices 40, 50, 60, 70 and 80 differ only with respect to the cooling of the air-oil volume flow that is conducted inside the conduit 38, and can in principle be combined with each other in any desired manner.

FIG. 3 to FIG. 6 respectively show, arranged inside the tank device 18, the first separation appliance 36 and the second separation appliance 39, wherein the first separation appliance 36 is supplied with oil from the areas 13, 29, 30 of the engine 1 that are impinged by oil by means of the recirculation pumps 34 via the conduit 35, and is supplied with an air-oil volume flow from the rear bearing chamber 30 by means of conduit 42. Via the conduit 38, an air-oil volume flow that is discharged from the first separation appliance 36 is introduced into the second separation appliance 39, and a cleaned air-oil volume flow is discharged into the environment via conduit 44.

Figure 3:
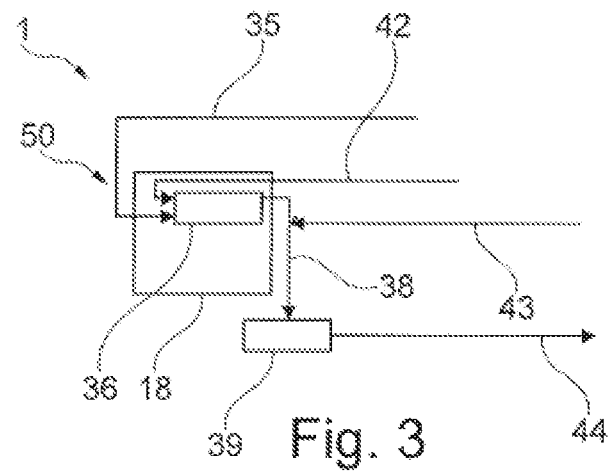
FIG. 3 shows a strongly simplified schematic diagram of a section of the oil circuit according to FIG. 2 with an alternatively embodied device for separating oil.

In the embodiment of the device 50 according to FIG. 3, oil that is conducted via conduit 43 in the direction of conduit 38 flows around conduit 38 at least in certain areas for cooling the air-oil volume flow conducted inside conduit 38, wherein a condensation of the vaporous oil inside conduit 38 is effected in this way, so that the oil droplets that are formed in the course of this process can be subsequently separated in a simple manner to the above-described degree.

Figure 4:
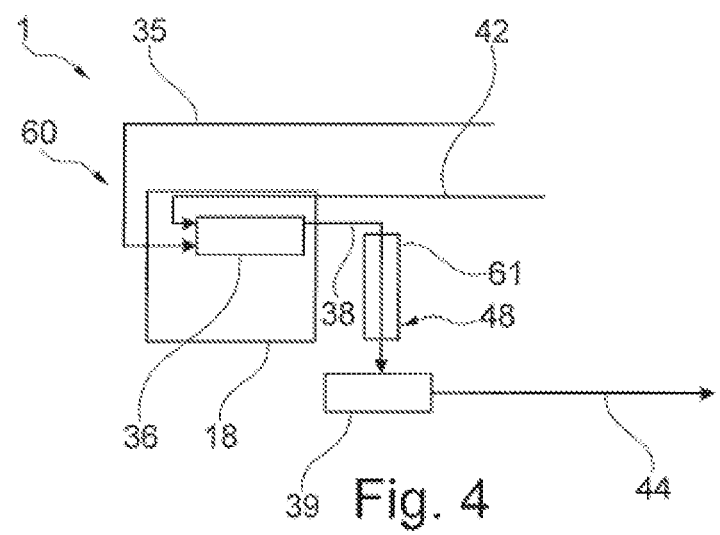
FIG. 4 shows, in a manner corresponding to FIG. 3, a schematic diagram with an alternatively embodied device for separating oil.

In a manner comparable to device 50, in the device 60 shown in FIG. 4, a cooling of the conduit 38 is achieved through the flow around at least one area of the conduit 38, wherein, in contrast to device 50, fuel is used as the cooling agent in device 60. The fuel is for example conducted through a conduit 61 that surrounds the conduit 38 at least in certain areas, wherein a cooling performance can be increased by surface enlargement of conduit 38, for example by providing ribs.

Figure 5:
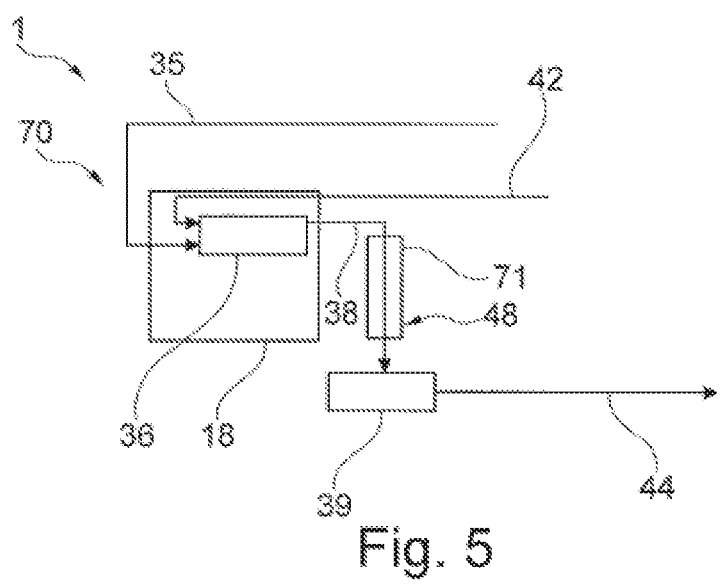
FIG. 5 shows, in a manner corresponding to FIG. 3, a schematic diagram with an alternatively embodied device for separating oil.

In the device 70 shown in FIG. 5, the conduit 38 is for example cooled by virtue of the air conducted inside conduit 71 flowing around it. As an alternative to that, the conduit 38 can extend at least in certain sections through the by-pass channel 2 of the aircraft gas turbine 1 or through another area of the aircraft gas turbine 1 that is passed by sufficiently cool air. In addition, a cooling performance can again be increased by a surface enlargement of the conduit 38, for example by providing ribs.

Figure 6:
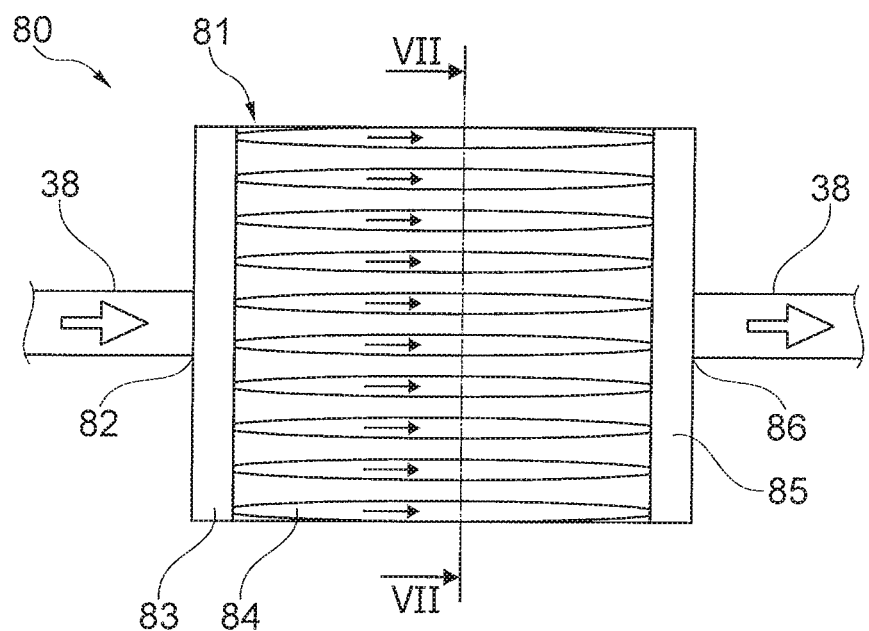
FIG. 6 shows a simplified rendering of a further alternatively embodied device for separating oil with an air cooling device in isolation.
Figure 7:
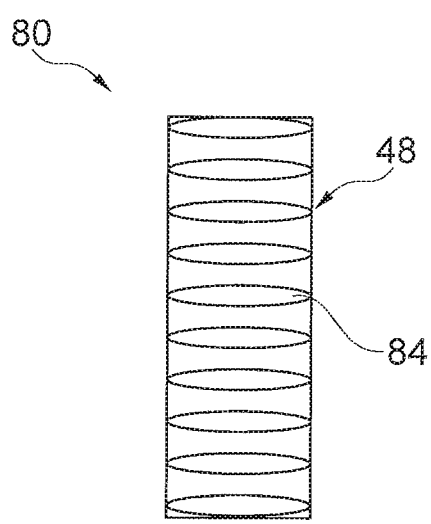
FIG. 7 shows a simplified sectional view of the device according to FIG. 6 along line VII-VII.

FIG. 6 and FIG. 7 show a device 80 with an appliance that is embodied as an air cooling appliance 81. Here, the air cooling appliance 81 is integrated into the conduit 38 and has an inlet area 82 via which the air-oil volume flow from the conduit 38 can be supplied to the air cooling appliance 81. Connecting downstream of the inlet area 82 is a distributing area 83, in which the air-oil volume flow conducted inside the conduit 38 is distributed to multiple conduits 84 that are embodied as cooling ribs. The conduits 84 converge again in a collecting area 85, wherein the air-oil volume flow is resupplied to the conduit 38 via an outlet area 86 of the air cooling appliance 81.

The conduits are impinged with cooling air in particular transversely to the flow direction of the air-oil volume flow inside the conduits 83, whereby the vaporous oil of the air-oil volume flow is condensed into oil droplets. For cooling the conduits 84 of the air cooling appliance 81, the air cooling appliance 81 can be arranged inside the by-pass channel 2 at least in certain areas.

PARTS LIST 1 turbomachine; aircraft gas turbine
2 by-pass channel
3 intake area
4 fan
5 engine core
6 compressor appliance
7 burner
8 turbine appliance
9, 10, 11 rotor device
12 engine shaft
13 auxiliary unit gear box appliance
14 engine casing
15 drive shaft
16 auxiliary units
16A inner gear box
18 tank device
20 oil circuit
25 pump appliance
26 cooling appliance
27 bearing appliance
28 bearing appliance
29 front bearing chamber
30 rear bearing chamber
31 bearing appliance
32 drive shaft
34 recirculation pump
35 conduit
36 first separation appliance; cyclone
37 pressure limiting valve
38 conduit
39 second separation appliance; breather
40 device
41 to 44 conduit
45 wall
46 interior space
48 appliance for cooling
49 appliance for spraying in oil
50 device
60 device
61 conduit
70 device
71 conduit
80 device
81 air cooling appliance
82 inlet area
83 distributing area
84 conduit
85 collecting area
86 outlet area

The invention claimed is:

1. A device of a turbomachine for separating oil from an air-oil volume flow, comprising:
   a first separation appliance,
   a second separation appliance,
   a flow path for supplying an air-oil volume flow from an oil-loaded area of the turbomachine to the first separation appliance for reducing an oil loading of the air-oil volume flow,
   a conduit positioned downstream of the first separation appliance and connecting the first separation appliance to the second separation appliance for supplying the air-oil volume flow to the second separation appliance,
   a cooling appliance for cooling the air-oil volume flow conducted inside the conduit, the cooling appliance is arranged along the conduit downstream of the first separation appliance and upstream of the second separation appliance,
   an oil tank for holding oil of an oil circuit of the turbomachine, wherein the first separation appliance is arranged inside the oil tank for venting returned oil.

2. The device according to claim 1, wherein the cooling appliance is an air cooling appliance.

3. The device according to claim 1, wherein the cooling appliance includes a by-pass channel of the turbomachine, wherein the conduit extends inside the by-pass channel at least in certain areas.

4. The device according to claim 1, wherein the cooling appliance is an oil cooling appliance.

5. The device according to claim 1, wherein the cooling appliance is a fuel cooling appliance.

6. The device according to claim 1, wherein the cooling appliance includes an oil introduction appliance for introducing oil into the conduit.

7. The device according to claim 1, wherein the first separation appliance is a cyclone separator.

8. The device according to claim 1, wherein the second separation appliance is a centrifugal separator.

9. The device according to claim 1, and further comprising at least one further conduit for supplying an air-oil volume flow from a bearing chamber of the turbomachine to the first separation appliance.

10. The device according to claim 1, wherein:
the first separation appliance is a cyclone separator;
the second separation appliance is a centrifugal separator; and
the cooling appliance includes at least one chosen from:
an air cooler;
a by-pass channel of the turbomachine, wherein the conduit extends inside the by-pass channel at least in certain areas;
an oil cooler;
a fuel cooler; and
an oil sprayer for introducing oil into the conduit.

* * * * *